United States Patent [19]

Stephens

[11] Patent Number: 4,476,295
[45] Date of Patent: Oct. 9, 1984

[54] POLY-IMIDE-OXADIAZOLE SOLUBLE IN M-CRESOL

[75] Inventor: James R. Stephens, Naperville, Ill.

[73] Assignee: Standard Oil Company (Indiana), Chicago, Ill.

[21] Appl. No.: 497,402

[22] Filed: May 23, 1983

Related U.S. Application Data

[62] Division of Ser. No. 424,607, Sep. 27, 1982.

[51] Int. Cl.$^3$ .................. C08G 73/08; C08G 73/10
[52] U.S. Cl. ........................... 528/322; 528/363
[58] Field of Search ............................. 528/322, 363

[56] References Cited

U.S. PATENT DOCUMENTS 3,941,749  3/1976  Frost ................................ 528/363

Primary Examiner—Harold D. Anderson
Attorney, Agent, or Firm—Gunar J. Blumberg; William T. McClain; William H. Magidson

[57] ABSTRACT

Novel polyoxadiazoles soluble in m-cresol are disclosed. Also fibers, films, coatings and molded objects made therefrom. The copolyoxadiazoles are prepared from 5-t-butylisophthalic acid and N,N'-aliphatic or aromatic hydrocarbon radicals (4-carboxyphthalimide), when coreacted with either terephthalic acid or isophthalic acid or a mixture of terephthalic acid and isophthalic acid.

40 Claims, No Drawings

POLY-IMIDE-OXADIAZOLE SOLUBLE IN M-CRESOL

This is a division, of application Ser. No. 424,607, filed Sept. 27, 1982.

BACKGROUND OF THE INVENTION

FIELD OF THE INVENTION

The field of this invention relates to novel homo- and copolyoxadiazoles (Co-POD's) soluble in organic solvents such as m-cresol and useful as coatings, molded objects, films and fibers.

In the prior art, the article by Y. Iwakura, et al., in *The Journal of Polymer Science* (A) 3 page 45 (1965) a method for the synthesis of polyoxadiazoles from hydrazine sulfate and simple diacids such as terephthalic acid is disclosed. Other prior art references include the article by R. S. Jones, et al., in *The Journal of Applied Polymer Science*, Vol. 25, pages 315–321 (1980), British Patent Specification No. 1,455,776; Canadian Pat. No. 882,785 and the article by S. K. Varma, et al., in *The Journal of Applied Polymer Science*, Volume 26, pages 571–577 (1981).

The following Japanese patents further illustrate the prior art: J79,029,509-B42; J79,034, 732-B47; J80,027,918-C34 and J50,037,778-W28.

None of the foregoing references contemplates polyoxadiazoles soluble in m-cresol and useful as coatings, molded objects and films. In the book *Thermally Stable Polymers* by P. E. Cassidy, Marcel Dekker, Inc., New York, 1980, p. 188, the author states that "fully aromatic polyoxadiazoles are soluble only in strong acids such as concentrated sulfuric or trifluoroacetic acid."

An object of this invention is to provide copolyoxadiazoles from 5-t-butylisophthalic acid (5-tBIA), and N,N'-1,2-ethylenebis(4-carboxyphthalimide), when co-reacted with either terephthalic acid or isophthalic acid or a mixture of terephthalic acid and isophthalic acid. Another object is to provide as a novel composition of matter poly(5'-t-butyl-1',3'-phenylene-1,3,4-oxadiazole-2,5-diyl). A further object is to provide molded objects, coatings, films and fibers from the aforementioned copolyoxadiazoles and polyoxadiazoles.

I have found that the novel Co-POD's and homopolyoxadiazoles can be prepared by reacting 5-t-butylisophthalic acid with terephthalic acid or isophthalic acid or a mixture of both, and N,N'-1,2-ethylenebis(4-carboxyphthalimide) (NEBC) with hydrazine sulfate, utilizing fuming sulfuric acid as the participating reaction medium. In case of the homopolymer only the 5-t-butylisophthalic acid is reacted with hydrazine sulfate utilizing sulfuric acid as the participating reaction medium.

The reaction is conducted at a temperature of about 25° to about 250° C. The Co-POD's and polyoxadiazoles have an inherent viscosity measured in sulfuric acid at 25° C. at about 0.6 to 6.0 or higher.

Our polyoxadiazoles comprise three broad categories of polyoxadiazoles soluble in m-cresol. They comprise:

1. A polyoxadiazole soluble in m-cresol comprising the following repeating structure:

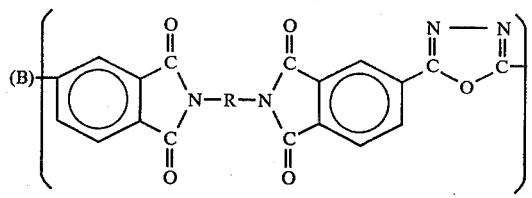

and

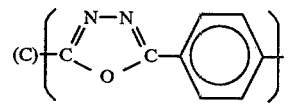

and

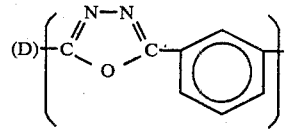

wherein R is an aliphatic or aromatic radical and the ratio of B units to C units and D units is about 100:100 and the ratio of C units to D units is about 1:99 to about 99:1.

The novel Co-POD's comprise moieties of the following repeating structures:

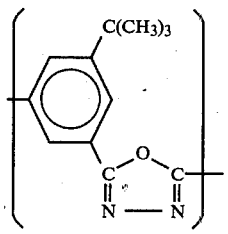

A.

and

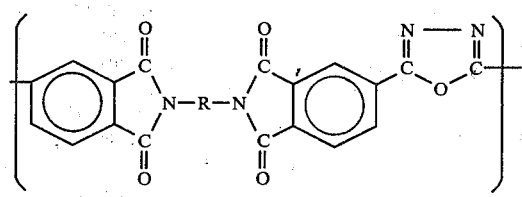

B.

The Co-POD's can comprise 100 percent of A moieties and still be soluble in m-cresol, however, Co-POD's comprising 100 percent B units are not soluble in m-cresol. Therefore with B units, other units set forth below have to be copolymerized.

Suitable other units use A,

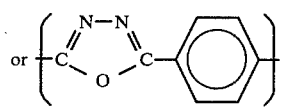

C or or 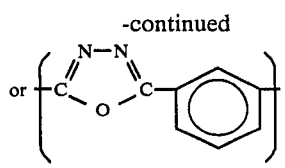 D which have to be copolymerized with B units to obtain m-cresol soluble polymers.

Suitable Co-POD's soluble in m-cresol comprise ABCD units, ABC units, ABD units, AC units, AD units, AB units, and BD units and BC units, or just A units. The mole ratio of A to B units can vary from about 1:99 to about 99:1; however, all Co-POD's of this invention should comprise at least fifty mole percent of either A units or a combination of A and B units. The ratio of C to D units can vary from about 1:99 to 99:1.

The mole ratio of B to D units can vary from about 70:30 to about 30:70. In Unit B, R can be an aliphatic or aromatic moiety. Suitably when R is an aliphatic hydrocarbon the carbon chain comprises from about 1 to about 12 carbon atoms. When R is an aromatic hydrocarbon radical the carbon atoms are in the range of about 6 to about 20. The preferred values for r are $(CH_2)_2$, $(CH_2)_6$,

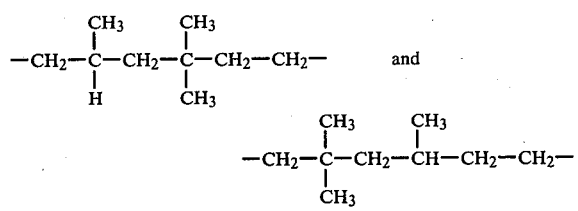

or mixture of the last two radicals in a ratio of about 1:99 to about 99:1 preferably in a ratio of 1:1.

The novel Co-POD's are soluble in m-cresol and are useful in fiber, film, coating and molding applications. They can also be utilized as felts.

It is important that the carboxylic acids do not sulfonate or are not degraded by oleum or fuming sulfuric acid.

the novel Co-POD's have excellent thermal properties and can be molded into useful articles, cast into films and coatings, or spun into fibers.

Fibers can be manufactured from the homo- and copolymers in the following manner: The reaction solution, after completion of the polycondensation of the hydrazine sulfate with the appropriate diacid is cooled and mixed with sulfuric acid until a solution with the required viscosity is formed. The mixture is homogenized with stirring, and the resulting solution is filtered through an acid-proof fabric and deaerated under vacuum. The resulting spinning solution is formed into fibers using about a 0 to 55 percent aqueous solution of sulfuric acid as spinning batch. Non-washed, freshly formed fibers are oriented by stretching, for example, in air, or in a bath of about 0 to about 70 percent, then washed with water to remove the sulfuric acid and dried. A useful fiber spinning method is disclosed by R. S. Jones, et al., *The Journal of Applied Polymer Science*, Vol. 25, 315–321 (1980).

The polymerization reactions can be carried out in fuming sulfuric acid or polyphosphoric acid. The following examples illustrate the preferred embodiment of the invention. It will be understood that the examples are for illustrative purposes only and do not purport to be wholly definitive with respect to conditions or scope of the invention.

EXAMPLE 1

General Procedure

A small resin flask fitted with a sealed stirrer, pressure equalized dropping funnel, a flowing nitrogen blanket to keep out air and carry off vent gases, was charged with 0.0245 mole of aromatic diacid as mixtures and 3.99 grams or 0.0307 mole of hydrazine sulfate. Forty grams of fuming sulfuric acid (30 percent $SO_3$) were added all at once to the dry reactant mixture. Stirring was commenced simultaneously with the flask being lowered into a hot oil bath controlled at 150° C. Stirring was continued for 30 minutes. During this time complete solution of reactants usually took place within 10 minutes. Some foaming also took place, and usually within 20 minutes a large and abrupt rise in viscosity took place. At the end of the stirring-heating period the viscous reaction solutions were either poured or added in chunks to 500 ml. of cold distilled water in a home blender and agitated for ca. 10 seconds or until particles or fibrids in the millimeter range were obtained. The precipitated polymers were then washed slowly with several portions of distilled water until the effluent water had a pH of ca. 5. After a brief period of air drying on the filter, the polymers were dried either 16 hours at 130° C. under vacuum or at this temperature to constant weight.

Using the above procedure, a number of copolymers (and comparison homopolymers) were made. Their characterization is shown in Table 1 and Table 2.

Film Preparation

Co-POD's were dissolved in m-cresol at 15 percent solids content, spread on glass or steel plates at ca. 5 mil wet thickness, then baked at 316° C. in a circulating air oven for 10 minutes. The resultant films were inspected—all tested were tough and integral.

TABLE 1

COPOLYOXADIAZOLES
Solubility in m-Cresol and Tg

| Molar % of Aromatic Diacid in POD | | | |
|---|---|---|---|
| TA | IA | 5-tBIA | NEBC |
| — | 50 | 50 | — |
| — | — | 50 | 50 |
| 10 | 20 | 40 | 30 |
| — | 50 | — | 50 |
| — | 40 | — | 60 |
| — | 60 | — | 40 |
| — | 63 | 37 | — |

| $[\eta]_{0.5}$ in $H_2SO_4$ | m-Cresol | Tg |
|---|---|---|
| 3.7 | Yes | 306° C. |
| 1.5 | Yes | 291 |
| 1.4 | Yes | 298 |
| 0.8 | Yes | 290 |
| 1.7 | Yes | 292 |
| 1.6 | Yes | 292 |
| 2.3 | No | 310 |

Tg obtained by Differential Scanning Colorimetry (DSC)
(100% TA, IA, or NEBC are insoluble in m-cresol)
Amorphous Co—POD's have been compression molded at 425° C. and 15 M psi.

TABLE 2
COPOLYOXADIAZOLE FILMS - COMPOSITION, CHARACTERIZATION AND APPEARANCE

| Laboratory Run Code | Aromatic Diacid Composition in Molar % | | | | Tg |
|---|---|---|---|---|---|
| | TA | IA | 5-tBIA | NEBC | |
| 6353 - 93 | 20 | 30 | 50 | — | 327° C. |
| 94 | — | — | 50 | 50 | 291 |
| 95 | — | 33⅓ | 33⅓ | 33⅓ | 288 |
| 96 | 25 | 25 | 25 | 25 | 306 |
| 97 | 10 | 20 | 40 | 30 | 298 |
| 98 | 10 | 20 | 30 | 40 | 295 |

| Laboratory Run Code | Inherent Viscosity at 0.5 g/dl. in H₂SO₄ | Viscosity in Stokes of 15% Solutions in m-cresol |
|---|---|---|
| 6353 - 93 | 4.1 | 1000 |
| 94 | 1.5 | 20 |
| 95 | 1.3 | 15 |
| 96 | 1.5 | 41 |
| 97 | 1.4 | 17 |
| 98 | nt | nt |

| Laboratory Run Code | Appearance after Evaporative Bake at 316° C. for 10 minutes |
|---|---|
| 6353 - 93 | Poor Film Mainly Opaque |
| 94 | Clear and Tough |
| 95 | Mainly Clear |
| 96 | Mainly Clear |
| 97 | Almost Clear |
| 98 | Almost Clear |

Tg obtained by DSC
nt = not tested

EXAMPLE 3

Preparation of Poly(3'-t-butyl-1',3'-phenylene-1,3,4-oxadiazole-2,5-diyl) (PBO)

A small resin flask fitted with a sealed stirrer, pressure equalized dropping funnel and $N_2$ flow to keep out air and carry off vent gases, was charged with a dry mixture of 5.445 g (0.0245 mole) of 5-t-butyl isophthalic acid and 3.99 grams (0.307 mole) of hydrazine sulfate. Forty grams of fuming sulfuric acid (30 percent $SO_2$) were added all at once to the dry reactant mixture. Stirring was commenced and the flask was lowered into a hot oil bath controlled at 150° C. Stirring was continued for 30 minutes. During this time complete solution of reactants took place followed by foaming and an abrupt rise in viscosity. At the end of the heating period the reaction was barely stirrable. The near solid reaction solution was cut up and added in chunks to 500 ml of cold distilled water in a home blender and agitated until ca. 3 mm size particles or fibrids were obtained. The polymer was then washed slowly on a filter with several portions of distilled water until the effluent had a pH of ca. 5. After air drying at room temperature, the polymer was dried 16 hours at 130° C. under vacuum to constant weight. It should be noted that PBO is soluble in m-cresol at room temperature and lower at useful concentrations, e.g., 10%; but when heated in solution at about this concentration it will crystallize and precipitate out.

EXAMPLE 4

Preparation of Poly(1',4'-phenylene-1,2,4-oxadiazole-2,5-diyl) (PPO)

A dry solids mixture of:
4.070 g of terephthalic acid (0.0245 mole) and
3.99 g of $H_4N_2.H_2SO_4$ (0.0307 mole)
was processed exactly as above to yield PPO.

EXAMPLE 5

A 10-fold scale-up of the above procedure yielded a PPO of lower inherent viscosity.

| Preparative Examples | Product Characterization | |
|---|---|---|
| | PBO | PPO |
| Solubility H₂SO₄ | sol | sol |
| Solubility m-cresol | sol | insol |
| η₀.₅ (H₂SO₄) | 4.26 | 3.54 |
| η₀.₅ (m-cresol) | 1.92 | insol |
| C, H, analysis³ (in %) | found C = 70.41, H = 5.80 theory = 71.98, H = 6.04 | found C= 62.17, H = 3.58 theory = 66.66, H = 2.80 |
| Dumas nitrogen (in %) | found = 14.79¹,³ theory = 13.99 | found = 17.28²,³ theory = 19.51 |

[1]Run under increased catalyst loading and higher temperatures.
[2]Normal Dumas nitrogen.
[3, 1, and 2]Polyoxadiazoles do not burn well in elementary analyses - the oxadiazole structure was confirmed by infra-red spectral analysis.

I claim:
1. A film forming polyoxadiazole soluble in m-cresol comprising the following repeating structural units:

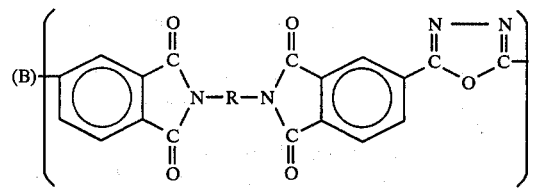

and

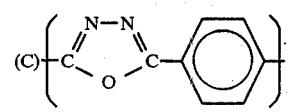

and

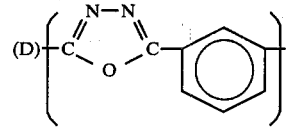

wherein R is an aliphatic or aromatic radical and the ratio of B units to C units and D units is about 100:100 and the ratio of C units to D units is about 1:99 to about 99:1.

2. The polyoxadiazole of claim 1 in the form of a molded object.

3. The polyoxadiazole of claim 1 in the form of a fiber.

4. The polyoxadiazole of claim 1 in the form of a film.

5. The polyoxadiazole of claim 1 in the form of a coating.

6. The polyoxadiazole of claim 1 wherein R is an aliphatic hydrocarbon radical of about 1 to 12 carbon atoms.

7. The polyoxadiazole of claim 1 wherein R is an aromatic hydrocarbon radical of about 6 to about 20 carbon atoms.

8. A film forming polyoxadiazole comprising the following structural units:

(B)―[structure with two phthalimide groups connected by N―R―N, linked to oxadiazole ring]

and (D)―[oxadiazole-phenylene structure]

wherein R is an aliphatic or aromatic radical.

9. The polyoxadiazole of claim 8 wherein the ratio of B units to D units is about 30:70 to about 70:30.

10. The polyoxadiazole of claim 9 in the form of a molded object.

11. The polyoxadiazole of claim 9 in the form of a fiber.

12. The polyoxadiazole of claim 9 in the form of a film.

13. The polyoxadiazole of claim 9 in the form of a coating.

14. The polyoxadiazole of claim 9 wherein R is an aliphatic hydrocarbon radical of about 1 to 12 carbon atoms.

15. The polyoxadiazole of claim 9 wherein R is an aromatic hydrocarbon radical of about 6 to about 20 carbon atoms.

16. A film forming polyoxadiazole comprising the following structural units:

(B)―[structure with two phthalimide groups connected by N―R―N, linked to oxadiazole ring]

and (D)―[oxadiazole-phenylene structure]

wherein R is an aliphatic or aromatic radical and wherein the ratio of B units to C units is about 99:1 to about 1:99.

17. The polyoxadiazole of claim 16 wherein the ratio of B units to C units is about 100:100.

18. The polyoxadiazole of claim 17 in the form of a molded object.

19. The polyoxadiazole of claim 17 in the form of a fiber.

20. The polyoxadiazole of claim 17 in the form of a film.

21. The polyoxadiazole of claim 17 in the form of a coating.

22. The polyoxadiazole of claim 17 wherein R is an aliphatic hydrocarbon radical of about 1 to 12 carbon atoms.

23. The polyoxadiazole of claim 17 wherein R is an aromatic hydrocarbon radical of about 6 to about 20 carbon atoms.

24. A film forming polyoxadiazole soluble in m-cresol comprising the following repeating structural units:

(B)―[structure with two phthalimide groups connected by N―CH$_2$CH$_2$―N, linked to oxadiazole ring]

and (C)―[oxadiazole-phenylene structure]

and (D)―[oxadiazole-phenylene structure]

25. The polyoxadiazole of claim 24 in the form of a molded object.

26. The polyoxadiazole of claim 24 in the form of a fiber.

27. The polyoxadiazole of claim 24 in the form of a film.

28. The polyoxadiazole of claim 24 in the form of a coating.

29. A film forming polyoxadiazole comprising the following structural units:

(B)―[structure with two phthalimide groups connected by N―CH$_2$CH$_2$―N, linked to oxadiazole ring]

and (D)―[oxadiazole-phenylene structure]

30. The polyoxadiazole of claim 29 wherein the ratio of B units to D units is about 30:70 to about 70:30.

31. The polyoxadiazole of claim 29 in the form of a molded object.

32. The polyoxadiazole of claim 29 in the form of a fiber.

33. The polyoxadiazole of claim 29 in the form of a film.

34. The polyoxadiazole of claim 29 in the form of a coating.

35. A film forming polyoxadiazole comprising the following structural units:

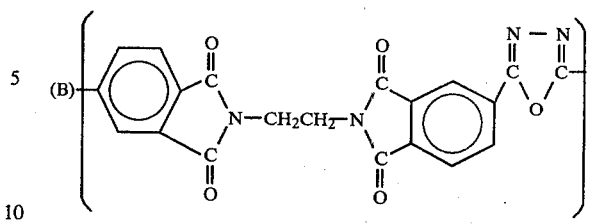

and

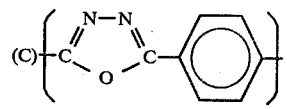

36. The polyoxadiazole of claim 35 wherein the ratio of B units to C units is about 100:100.

37. The polyoxadiazole of claim 35 in the form of a molded object.

38. The polyoxadiazole of claim 35 in the form of a fiber.

39. The polyoxadiazole of claim 35 in the form of a film.

40. The polyoxadiazole of claim 35 in the form of a coating.

* * * * *

UNITED STATES PATENT OFFICE
CERTIFICATE OF CORRECTION

Patent No. 4,476,295   Dated October 9, 1984

Inventor(s) STEPHENS, JAMES

It is certified that error appears in the above-identified patent and that said Letters Patent are hereby corrected as shown below:

| Column | Line  |   |
|--------|-------|---|
| 1      | 29    | "J79,034,  732-B47" should be --J79,034,732-B47 -- |
| 3      | 24    | "r" should be -- R -- |
| 3      | 44    | "the" should be -- The -- |
| 4      | 58    | "O" (looks like the Greek letter omicron) should be -- 0 -- (Zero) |
| 6      | 13    | "O" (looks like the Greek letter omicron) should be -- 0 -- (Zero) |
| 6      | 25    | "and" (in italics) should be -- and -- (not in italics) |
| 7      | 53-58 | "(D)" [chemical structure] should be -(C)- [chemical structure] -- |

UNITED STATES PATENT OFFICE
CERTIFICATE OF CORRECTION

Patent No. 4,476,295　　　　　　　　　Dated October 9, 1984

Inventor(s) STEPHENS, JAMES

It is certified that error appears in the above-identified patent and that said Letters Patent are hereby corrected as shown below:

Column　　Line 2　　　　30　After "99:1" delete --.-- and add --, and --
2　　　　30　After ", and" add -- 2. A polyoxadiazole comprising the following structure:

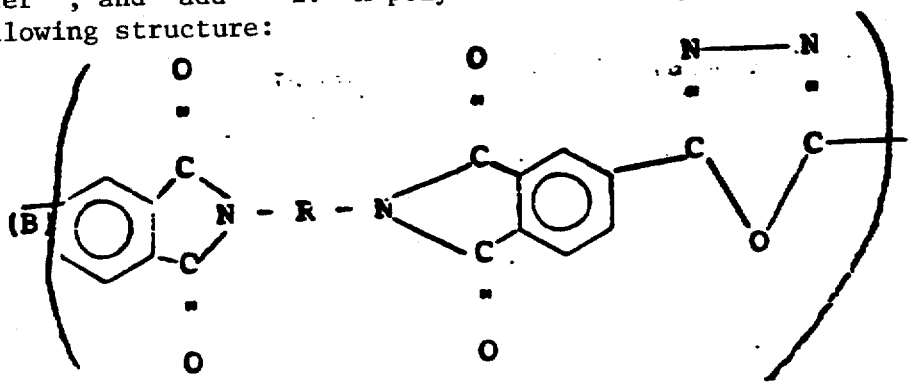

and

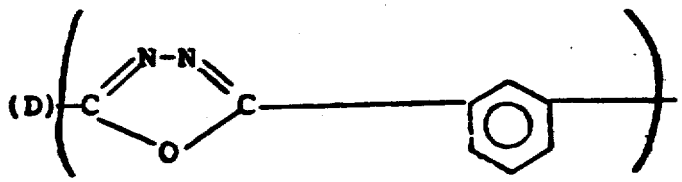

wherein R is an aliphatic or aromatic radical and the ratio of B units to C units and D units is about 100:100 and the ratio of C units to D units is about 1:99 to about 99:1, and 3. A polyoxadiazole comprising the following structure:

UNITED STATES PATENT OFFICE
CERTIFICATE OF CORRECTION

Patent No. 4,476,295    Dated October 9, 1984

Inventor(s) STEPHENS, JAMES

It is certified that error appears in the above-identified patent and that said Letters Patent are hereby corrected as shown below:

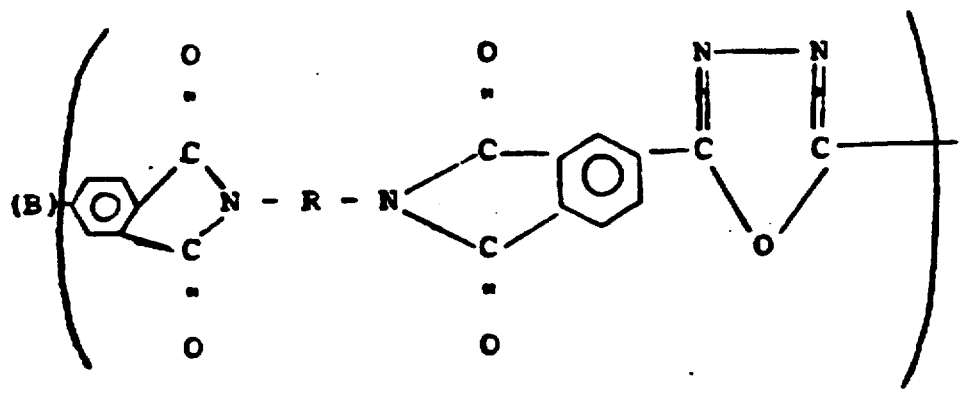

and

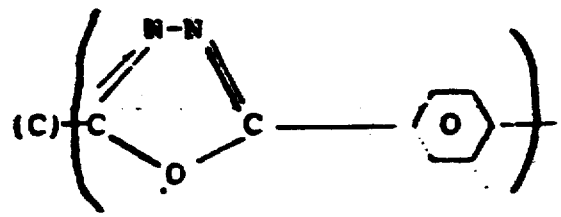

UNITED STATES PATENT OFFICE

CERTIFICATE OF CORRECTION

Patent No. 4,476,295               Dated   October 9, 1984

Inventor(s) STEPHENS, JAMES

It is certified that error appears in the above-identified patent and that said Letters Patent are hereby corrected as shown below:

> wherein R is an aliphatic or aromatic radical and
> wherein the ratio of B units to C units is about
> 99:1 to about 1:99. --    (Add all of insert A2)

Signed and Sealed this

Eleventh    Day of    June 1985

[SEAL]

*Attest:*

DONALD J. QUIGG

*Attesting Officer*    *Acting Commissioner of Patents and Trademarks*